United States Patent [19]

Sakurai et al.

[11] 4,330,646
[45] May 18, 1982

[54] POLYMERIZATION OF AN α-OLEFIN

[75] Inventors: Hisaya Sakurai; Yoshihiko Katayama; Tadashi Ikegami; Masayasu Furusato, all of Kurashiki, Japan

[73] Assignee: Asahi Kasei Kogyo Kabushiki Kaisha, Osaka, Japan

[21] Appl. No.: 170,385

[22] Filed: Jul. 21, 1980

[30] Foreign Application Priority Data

Aug. 13, 1979 [JP] Japan .............................. 54-102187
Aug. 16, 1979 [JP] Japan .............................. 54-103556
Aug. 25, 1979 [JP] Japan .............................. 54-108507

[51] Int. Cl.³ ........................ C08F 4/02; C08F 10/00
[52] U.S. Cl. ........................ 526/116; 252/429 B; 252/429 C; 526/122; 526/125; 526/127; 526/128; 526/133; 526/137; 526/149; 526/150; 526/339; 526/348; 526/348.2; 526/348.4; 526/348.5; 526/348.6; 526/348.7
[58] Field of Search .................. 252/429 B, 429 C; 526/122, 125, 127, 128, 133, 137, 149, 150, 116

[56] References Cited

U.S. PATENT DOCUMENTS 4,115,319 9/1978 Scata et al. .................... 526/125
4,159,965 7/1979 Sakurai et al. .................. 526/125
4,189,553 2/1980 Birkelbach ..................... 526/114
4,224,186 9/1980 Lowery et al. .................. 526/150

Primary Examiner—Edward J. Smith
Attorney, Agent, or Firm—Sprung, Horn, Kramer & Woods

[57] ABSTRACT

A process for polymerizing an α-olefin comprising contacting the olefin in liquid phase at a temperature of about 120° to about 320° C. with a catalyst comprising a component (A) and an organometal component (B), the component (A) being produced by reacting a hydrocarbon-soluble organomagnesium component (i) of the formula

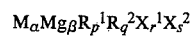

wherein α, p, q, r and s each independently is 0 or a number greater than 0, β is 1 or a number greater than 1, $p+q+r+s = m\alpha + 2\beta$, $0 \leq (r+s)/(\alpha+\beta) < 2$, m is the valence of M, M is a metal of the 1st to 3rd groups of the Periodic Table, $R^1$ and $R^2$ each independently is a hydrocarbon group having 1 to 20 carbon atoms, $X^1$ and $X^2$ each independently is hydrogen or an organic electronegative group containing O, N or S, with (ii) a halide of boron, silicon, germanium, tin, phosphorus, antimony, bismuth or zinc, and contacting the product of (i) + (ii) with (iii) a compound of titanium or (iii) a compound of titanium plus a compound of vanadium at a concentration of titanium plus vanadium of at most about 2 mols per liter of the inert reaction solvent, the atomic ratio of Mg/Ti or (Ti+V) in (A) being about 3 to about 500.

32 Claims, No Drawings

POLYMERIZATION OF AN α-OLEFIN

BACKGROUND OF THE INVENTION

1. Field of the Invention

This invention relates to a process for polymerizing an α-olefin in liquid phase using a novel catalyst.

2. Description of the Prior Art

It is known that solution polymerization is suitable for the production of polyethylene and its advantages are as follows;

(1) The polymerization of ethylene is an exothermic reaction and removal of heat is a big problem from the viewpoint of a process. Since the efficiency of removing heat increases with greater differences between the inner temperature of a reactor and that of a cooling jacket, solution polymerization in which a high polymerization temperature is employed is advantageous from this point.

(2) The degree of polymerization of ethylene, i.e. the molecular weight of polyethylene can be controlled comparatively accurately by varying the polymerization temperature and furthermore, the control of the molecular weight of polyether can be done by using a small amount of hydrogen.

(3) Since the molecular weight of polyethylene is correlated with the viscosity of the reaction solution, it can be estimated by measurement of the viscosity of the reaction solution in the reactor and the control of the molecular weight of polyethylene can be quickly done accordingly.

(4) Polyethylene is used or sold usually in the form of pellets. The polyethylene obtained by suspension polymerization and gas phase polymerization is powdery and it is necessary to melt-mold the powdery polyethylene into pellets by an extruder. On the other hand, according to solution polymerization it is possible to remove the polymerization solvent by evaporation with the use of the heat of polymerization and to introduce the polyethylene in its melt form into an extruder. As a result, excess step and heat for melting the polyethylene can be omitted. In order to make the most of this advantage, it is preferred that the polymerization temperature is high.

(5) In producing low density polyethylene by copolymerization of ethylene and an α-olefin by a slurry method, the formed polymer becomes easily soluble in the polymerization solvent and the polymerization reaction mixture in the reactor becomes gruel, resulting in a difficulty in continuing polymerization. Accordingly, it is difficult to produce polyethylene having a density less than about 0.945. On the other hand, according to solution polymerization, polymerization is conducted at high temperatures in the form of a complete solution without the above described problem and thus it is possible to produce polyethylene having a wide range of density from about 0.975 to about 0.910.

The disadvantage of solution polymerization is an increase in the solution viscosity due to the increase in the solution concentration or the molecular weight of polyethylene, which renders commercial scale production of polyethylene difficult. In order to avoid this disadvantage, it is necessary that the polymerization temperature is raised and simultaneously the solution viscosity is reduced. However, with increased polymerization temperatures the catalyst efficiency is decreased and a large amount of catalyst residue remains in the formed polyethylene and causes discoloration of the polyethylene and deterioration of molded articles obtained therefrom. Further, removal of catalyst residue is difficult. Thus, there are required catalysts having a high catalyst efficiency at high temperatures which enable complete omission of the catalyst removal step due to a small amount of catalyst residue present in the formed polyethylene.

There are known many Ziegler type catalysts having a high catalyst efficiency for suspension polymerization (see, e.g. U.S. Pat. Nos. 4,115,319, 4,159,965 and 4,163,831). However, the catalyst efficiency of these catalysts is, in general, decreased with increased polymerization temperatures, and especially at temperatures higher than about 150° C., the decrease in the catalyst efficiency is remarkable. Thus the performances of such catalysts are not enough to omit the removal step of catalyst residue when employed in solution polymerization.

There are also known catalysts for solution polymerization of an olefin which comprise an organomagnesium complex, an aluminum halide, hydrogen chloride, a halogenated secondary or tertiary alkyl of halogenated silicon compound and a titanium compound (see, e.g., U.S. Pat. Nos. 4,159,965 and 4,172,050 and U.K. Pat. Nos. 1,251,177 and 1,235,062). These catalysts have a higher catalyst efficiency than the conventional catalysts but their catalyst efficiency at high temperatures is still insufficient.

As a result of the study on the catalyst system for solution polymerization it has been discovered that by using, as a catalyst, a component having been obtained by reacting a specific organomagnesium compound with a halide and contacting the obtained product with a titanium compound and/or a vanadium compound, in combination with an organometal component, there can be obtained catalysts having a very high catalyst efficiency without any decrease at least at 150° C., especially at least at 180° C., and an excellent storage stability suitable for the polymerization of an olefin.

SUMMARY OF THE INVENTION

According to this invention there is provided a process for polymerizing an α-olefin comprising contacting the olefin in liquid phase at a temperature of about 120° to 320° C. with a catalyst comprising a component (A) and an organometal component (B), the component (A) being produced by reacting a hydrocarbon-soluble organomagnesium component (i) of the formula

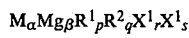

$$M_\alpha Mg_\beta R^1_p R^2_q X^1_r X^1_s$$

wherein
α, p, q, r and s each independently is 0 or a number greater than 0,
β is 1 or a number greater than 1,
p+q+r+s=mα+2β,
0≦(r+s)/(α+β)<2,
m is the valence of M,
M is a metal of the 1st to 3rd groups of the Periodic Table,
R¹ and R² each independently is a hydrocarbon group having 1 to 20 carbon atoms,
X¹ and X² each independently is hydrogen or an organic electronegative group containing O, N or S, with (ii) a halide of boron, silicon, germanium, tin, phosphorus, antimony, bismuth or zinc, and contacting the product of (i)+(ii) with (iii) a compound of titanium or (iii) a compound of titanium and a compound of vanadium at a concentration of titanium plus vanadium of at most about 2 mols per liter of the inert reaction solvent, the atomic ratio of Mg/Ti or (Ti+V) in (A) being about 3 to about 500.

One of the characteristic features of this invention is a high catalyst efficiency which reaches at least 500 Kg/g Ti or (Ti+V) as will be illustrated by the Examples. Accordingly, the step of removing catalyst residue can be omitted.

Another characteristic feature of this invention is that the catalyst of this invention is stable at high temperatures and the catalyst efficiency reaches 500 Kg/g Ti or (Ti+V) at a temperature of 180° C. or higher than 180° C.

Still another characteristic feature of this invention is that there can be obtained polymers having a narrow molecular weight distribution, a high molecular weight and a high rigidity suitable for injection molding.

A further characteristic feature of this invention is that there can be also obtained polymers having a broad molecular weight distribution suitable for extrusion molding by multistage polymerization having a plurality of polymerization zones where the polymerization conditions such as the temperature and the concentration of hydrogen are varied.

A still further characteristic feature of this invention is that polyethylene having a wide range of density of from about 0.975 to about 0.910 can be easily obtained.

DETAILED DESCRIPTION OF THE INVENTION

The organomagnesium component (i) which can be used in preparing the catalyst component (A) is represented by the formula $$M_\alpha Mg_\beta R^1_p R^2_q X^1_r X^2_s$$

wherein M, $R^1$, $R^2$, $X^1$, $X^2$, $\alpha$, $\beta$, p, q, r and s are the same as defined above, and includes dihydrocarbyl magnesium $R_2Mg$ wherein R is a hydrocarbon group and complexes of dihydrocarbyl magnesium with other organometal compounds.

In this formula, $R^1$ and $R^2$ each independently is a hydrocarbon group having 1 to 20 carbon atoms. Exemplary hydrocarbon groups include alkyl groups such as methyl, ethyl, propyl, butyl, amyl, hexyl and decyl groups; cycloalkyl groups such as cyclohexyl group; aryl groups such as phenyl group; and aralkyl groups such as benzyl group. Of these groups, alkyl groups are preferred. M is a metal of the 1st to 3rd groups of the Periodic Table. Exemplary metals represented by M include lithium, sodium, potassium, beryllium, calcium, strontium, barium, zinc, boron and aluminum. Of these metals, lithium, beryllium, boron, aluminum and zinc are preferred due to their ease in making hydrocarbon-soluble organomagnesium complexes. A more preferred metal is aluminum. The atomic ratio of M to Mg, i.e., $\alpha/\beta$ may be widely varied but it is preferred to employ the hydrocarbon-soluble organomagnesium complex in which the $\alpha/\beta$ ratio is 0 to 1.5. It is more preferred to employ the hydrocarbon-soluble organomagnesium in which the $\alpha/\beta$ ratio is 0 to 1. $X^1$ and $X^2$ each independently is a hydrogen atom or an organic electronegative group containing O, N or S. Exemplary organic electronegative groups include $OR^3$, $OSiR^4R^5R^6$, $NR^7R^8$ and $SR^9$ groups wherein $R^3$, $R^7$, $R^8$ and $R^9$ each independently is a hydrocarbon group having 1 to 15 carbon atoms and $R^4$, $R^5$ and $R^6$ each independently is a hydrogen atom or a hydrocarbon group having 1 to 15 carbon atoms. Exemplary hydrocarbon groups include alkyl groups such as methyl, ethyl, propyl, butyl, amyl, hexyl and decyl groups; cycloalkyl groups such as cyclohexyl group; aryl groups such as phenyl group; and aralkyl groups such as benzyl group. Of these organic electronegative groups, $OR^3$ and $OSiR^4R^5R^6$ are preferred. More preferred organic electronegative groups are $OR^3$ and $OSiR^4R^5R^6$ wherein $R^3$, $R^4$, $R^5$ and $R^6$ each independently is an alkyl group having 1 to 10 carbon atom or at least one of $R^4$, $R^5$ and $R^6$ is a hydrogen atom and the remaining are alkyl groups having 1 to 10 carbon atoms. $\alpha$, p, q, r and s each independently is 0 or a number greater than 0 and $\beta$ is 1 or a number greater than 1 and the relationship of $p+q+r+s=m\alpha+2\beta$ wherein m is the valence of M is satisfied. This relationship shows stoichiometry between the valence of M plus Mg and the substituents. The range of $0 \leq (r+s)/(\alpha+\beta) < 2$ designates that a total number of $X^1$ and $X^2$ per total number of M and Mg is 0 to 2. It is preferred to employ the range of $0 < (r+s)/(\alpha+\beta) \leq 1$ in order to obtain a high catalyst activity at a polymerization temperature of least 180° C.

In general, organomagnesium compounds are insoluble in an inert hydrocarbon but those with $\alpha > 0$ are soluble in an inert hydrocarbon. In this invention it is essential that the organomagnesium compounds are soluble in an inert hydrocarbon. Also organomagnesium compounds with $\alpha = 0$ such as $(sec\text{-}C_4H_9)_2Mg$, $(C_2H_5)Mg(n\text{-}C_4H_9)$ and $(n\text{-}C_6H_{12})_2Mg$ are soluble in an inert hydrocarbon and accordingly, can be used in this invention with good results.

The organomagnesium compounds can be prepared by reacting a compound of $R^1MgQ$ or $R^1_2Mg$ wherein $R^1$ is the same as defined above and Q is a halogen atom, with an organometal compound of $MR^2_m$, $MR^2_aX^1_bX^2_c$ or $MQ_aX^1_bX^2_c$ wherein M, $R^2$, $X^1$, $X^2$, Q and m are the same as defined above and $a+b+c=m$, in an inert hydrocarbon medium such as hexane, heptane, octane, cyclohexane, benzene and toluene at a temperature of about 0° C. to about 150° C., and, if necessary or if desired, further reacting the resulting reaction product with an alcohol, siloxane, amine, imine, thiol or a dithio compound. Furthermore, the organomagnesium compound can be prepared by reacting a compound of $MgX^1_2$ or $R^1MgX^1$ with a compound of $MR^2_m$ or $MR^2_{m-}H$ or by reacting a compound of $R^1MgX^1$ or $R^1_2Mg$ with a compound of $R^2_nMX^2_{m-n}$ or $X^1_aMX^2_{m-a}$ wherein M, $R^1$, $R^2$, $X^1$, $X^2$ and m are the same as defined above and a is a number of 0 to m.

The halides (ii) of boron, silicon, germanium, tin, phosphorus, antimony, bismuth of zinc which can be employed are the compounds having at least one halogen atom. Preferred halides are the chlorides. Exemplary halides include boron trichloride, diethylboron chloride, dibutylboron chloride, ethylboron dichloride, butylboron dichloride, ethoxyboron dichloride, methylchlorosilane, methyldichlorosilane, trichlorosilane, methyltrichlorosilane, dimethylchlorosilane, dimethyldichlorosilane, trimethylchlorosilane, ethyldichlorosilane, ethyltichlorosilane, diethylchlorosilane, diethyldichlorosilane, triethylchlorosilane, vinyltrichlorosilane, vinyldichlorosilane, propyltrichlorosilane, propyldichlorosilane, allyltrichlorosilane, butyltrichlorosilane, butyldichlorosilane, sym-tetramethyldichlorosilane, octyldichlorosilane, decyldichlorosilane, hexachlorodisilmethylene, hexachlorocyclotrisilmethylene, phenyltrichlorosilane, phenyldichlorosilane, benzyltrichlorosilane, tetrachlorosilane, ethoxytrichlorosilane, diethoxydichlorosilane, butoxydichlorosilane, octoxytrichlorosilane, tetrachlorogermane, methyltrichlorogermane, dimethyldichlorogermane, trimethylchlorogermane, ethyltrichlorogermane, butyltrichlorogermane, tin tetrachloride, methyltrichlorotin, diethyldichlorotin, dibutoxydibutyltin, trioctylchlorotin, phosphorus trichloride, phosphorus pentachloride, ethyldichlorophosphine, propyldichlorophosphine, methyldichlorostibine, trimethylantimony dichloride, tripropylantimony dichloride, methyldichlorobismuthine, ethyldichlorobismuthine, butyldichlorobismuthine, dimethylchlorobismuthine, zinc chloride, ethylzinc chloride and butylzinc chloride. Of these compounds, chlorides of boron, silicon or germanium are preferred in order to obtain a high catalyst efficiency at a polymerization temperature of at least 180° C. More preferred compounds are chlorosilanes.

The compounds (iii) of titanium and the compounds (iii) of vanadium which can be employed include halides, oxyhalides, alkoxyhalides, alkoxides and oxyalkoxides of titanium or vanadium such as titanium tetrachloride, titanium tetrabromide, titanium tetraiodide, ethoxytitanium trichloride, propoxytitanium trichloride, butoxytitanium trichloride, dipropoxytitanium dichloride, dibutoxytitanium dichloride, tripropoxytitanium monochloride, tributoxytitanium monochloride, tetrapropoxytitanium, tetrabutoxytitanium, vanadium tetrachloride, vanadyl trichloride, monobutoxyvanadyl dichloride, dibutoxyvanadyl monochloride, tributoxyvanadyl and ethoxytrichlorovanadium. When the compound of titanium is used alone, it is preferred to employ the compound of titanium having at least one halogen atom. In order to narrow the molecular weight distribution of the polyolefins produced and to reduce the amount of vinyl group in the polyolefins produced, it is preferred to use the compound of titanium together with the compound of vanadium. In this case it is preferred that the mol ratio of the compound of titanium to the compound of vanadium is about 0.1 to about 10. A more preferred mol ratio ranges from about 0.2 to about 5.

The reaction of the hydrocarbon-soluble organomagnesium component (i), the halide (ii) and the compound (iii) can be conducted in an inert reaction medium or solvent. Exemplary inert reaction solvents employed in this invention include aliphatic hydrocarbons such as hexane, heptane and octane; aromatic hydrocarbons such as benzene and toluene; alicyclic hydrocarbons such as cyclohexane and cyclomethylhexane; and any mixtures thereof. It is preferred from the viewpoint of the catalyst performances that aliphatic hydrocarbons are employed. With the order of the reaction of these components (i), (ii) and (iii), previous contact of the component (i) with the compound (iii) should be avoided in order for the catalyst to exhibit its high activity. More specifically, the surprising effect of this invention can be accomplished by firstly reacting the component (i) with the halide (ii) to form a solid product and secondly contacting the compound (iii) with the surface of the solid product effectively.

The reaction between the component (i) and the halide (ii) may be carried out by adding these two components into a reaction zone at the same time or by firstly charging one of them into the reaction zone and secondly adding the other into the reaction zone. The reaction temperature was not particularly limited and typically ranges from about −50° C. to about 150° C. A preferred reaction temperature ranges from about 0° C. to about 100° C. from the viewpoint of the progress of reaction. The mol ratio of the halide (ii) to the component (i) which can be employed in this invention is not particularly limited and typically ranges from about 0.001 to about 100. A preferred mol ratio of the halide (ii) to the component (i) ranges from about 0.01 to about 20. The solid product obtained by the reaction between the component (i) and the halide (ii) may be usually separated by filtration or washed by decantation and then supplied to the contact with the compound (iii). In order to simplify the reaction procedure, it is preferred that the compound (iii) is added to the reaction solution obtained after completion of the reaction between the component (i) and the halide (ii), and further the contact with the compound (iii) is continued.

In order to impart a high catalyst activity at high temperatures to the catalyst, it is essential to control the amount of the compound (iii) employed and the concentration of the compound (iii) in the reaction solution. The atomic ratio of Mg/Ti or (Ti+V) which is used in this invention ranges from about 3 to about 500, and a preferred atomic ratio of Mg/Ti or (Ti+V) ranges from about 5 to about 200. A more preferred atomic ratio of Mg/Ti or (Ti+V) ranges from about 10 to about 100. The concentration of Ti or Ti plus V in the reaction solution used in this invention is at most 2 mols per liter of the inert reaction solvent. A preferred concentration of Ti or Ti plus V in the reaction solution ranges from about 0.01 to about 900 mmols per liter of the inert reaction solvent. The temperature for contacting the solid product formed by the reaction between the component (i) and the halide (ii) with the compound (iii) is not particularly limited and typically ranges from about −50° C. to about 150° C., preferably from about 0° C. to about 95° C.

The component (A) of this invention becomes an excellent catalyst for polymerizing an olefin in combination of an organometal component (B).

Exemplary organometal components (B) which can be used in this invention are organoaluminum compound including trialkylaluminums such as $Al(C_2H_5X)_3$, $Al(C_3H_7)_3$, $Al(C_4H_9)_3$, $Al(C_5H_{11})_3$, $Al(C_6H_{13})_3$, $Al(C_8H_{17})_3$ and $Al(C_{10}H_{21})_3$, alkylaluminum halides such as $Al(C_2H_5)_2Cl$, $Al(C_2H_5)Cl_2$, $Al(i-C_4H_9)_2Cl$ and $Al(C_2H_5)_2Br$, alkylaluminum alkoxides such as $Al(C_2H_5)_2(OC_2H_5)$ and $Al(i-C_4H_9)_2(OC_4H_9)$, alkylaluminum siloxides such as $Al(C_2H_5)_2(OSiH.CH_3.C_2H_5)$ and $Al(i-C_4H_9)[OSi(CH_3)_2.i-C_4H_9]_2$, reaction products of a trialkylaluminum and a conjugated diene such as aluminum isoprenyl and aluminum myrcenyl; organoboron compounds such as trialkylborons such as $B(C_2H_5)_3$, $B(C_3H_7)_3$, $B(C_4H_9)_3$, $B(C_6H_{13})_3$ and $B(C_8H_{17})_3$, triarylborons such as $B(C_6H_5)_3$, alkylboron alkoxides such as $B(C_5H_{11})_2(OC_4H_9)$ and alkylboron halides such as $B(C_7H_{15})_2Cl$; organozinc compounds such as dialkylzincs including $Zn(C_2H_5)_2$, $Zn(C_4H_9)_2$, $Zn(C_6H_{13})_2$, $Zn(C_8H_{17})_2$ and $Zn(C_2H_5)(n-C_3H_7)$, diarylzincs such as $Zn(C_6H_5)_2$ and alkylzinc alkoxides such as $Zn(C_3H_7)(OC_4H_9)$; the same organomagnesium component (i) as described above, and any mixtures thereof. Of these organometal compounds, organoaluminum compounds are preferred, and trialkylaluminums and alkylaluminum halides are more preferred.

The component (A) and the organometal component (B) may be added under the polymerization conditions to the polymerization system or may be combined prior to the polymerization.

The mol ratio of the organometal component (B) to Ti or (Ti+V) in the component (A) typically ranges from about 3 to about 1,000 and preferably ranges from about 5 to about 500.

The catalyst of this invention is suitable for the polymerization of ethylene and may also be employed for the copolymerization of ethylene with another α-olefin having 3 to 20 carbon atoms such as propylene, butene-1, isobutene, hexene-1, 4-methylpentene-1, octene-1 and or with a polyene such as butadiene and isoprene. In the copolymerization it is preferred to employ the mol ratio of the α-olefin to be copolymerized to ethylene of at most 5. According to this invention it is possible to produce polyethylene having a density of about 0.975 to about 0.910 by the homo- or co-polymerization of ethylene.

In this invention, polymerization is conducted at a temperature ranging from about 120° C. to about 320° C., preferably from about 150° C. to about 300° C. by the solution polymerization method. As the polymerization medium or solvent there can be employed aliphatic hydrocarbons such as hexane, heptane or octane; aromatic hydrocarbon such as benzene, toluene or xylene; and alicyclic hydrocarbons such as cyclohexane or methylcyclohexane. The catalyst is introduced into a reactor together with the polymerization solvent and ethylene is added at a pressure of ethylene of from about 0.1 to about 40 MPa, preferably from about 1 to about 25 MPa in an inert atmosphere and polymerized. Also it is possible to employ such a means as a stirrer for providing better contact between ethylene and the catalyst in the polymerization.

The process of the present invention can produce polyethylene having a narrow molecular weight distribution suitable for injection molding in the single stage polymerization having one polymerization zone. Also the process of this invention can produce polyethylene having a broad molecular weight distribution suitable for extrusion molding by the multistage polymerization having a plurality of polymerization zones, usually two to six polymerization zones connected in series or in parallel where the polymerization conditions such as the polymerization temperature, the concentration of hydrogen and the mol ratio of the catalyst are varied.

In order to control the molecular weight of the polymer, the temperature of the reactor may be varied or it is also possible to add hydrogen or an organic compound which can easily cause chain transfer. Furthermore, the process of this invention may be combined with a method of using a titanate as a third component for controlling the density of the polymer formed.

The present invention will now be illustrated in greater detail with reference to several Examples, but they are given for illustrative purposes only and are not to be construed as limiting the invention.

In these examples MI designates a melt index of a polymer which is measured at 190° C. under a load of 2.16 Kg in accordance with ASTM D-1238. FR designates a flow ratio represented by $MI_{21.6}/MI_{2.16}$ wherein $MI_{21.6}$ is a melt index of the polymer measured at 190° C. under a load of 21.6 Kg and $MI_{2.16}$ is the melt index measured at 190° C. under a load of 2.16 Kg and is one of the criteria for the molecular weight distribution. A lower FR shows a narrower molecular weight distribution. The term "catalyst efficiency" shows the amount of polymer formed in kilogram per gram of Ti or Ti plus V.

EXAMPLE 1

(I) Synthesis of Hydrocarbon-soluble Organomagnesium Component (i)

In a 200 ml flask purged with nitrogen were charged 5 g of magnesium powder, and then 20 ml out of a mixed solution of 20.8 ml of n-butyl chloride and 60 ml of heptane were added thereto. The flask was heated and the resulting mixture was refluxed with stirring. After the reaction was started, the remaining mixed solution of n-butyl chloride and heptane was added dropwise to the flask over two hours under refluxing. After completion of the reaction, the reaction mixture was stirred further for one hour, and 20 ml of a heptane solution containing 12 mmols of $AlCl_2(On-C_4H_9)$ was added thereto and the reaction was continued at 70° C. for two hours to give an organomagnesium component solution. As a result of analysis, the composition of this complex was $AlMg_{7.5}(n-C_4H_9)_{16.9}(On-C_4H_9)_{0.9}$ and the concentration of the organometal was 0.86 mol per liter of the reaction solvent.

The $AlCl_2(On-C_4H_9)$ employed was prepared by reacting aluminum powder, $AlCl_3$ and $n-C_4H_9OH$ at a mol ratio of 1:2:3 in heptane.

(II) Synthesis of Component (A)

The oxygen and moisture present inside a 250 ml flask equipped with a dropping funnel and a water-cooled reflux condenser were purged with nitrogen, and to the flask were charged 20 ml of a heptane solution containing trichlorosilane in an amount of 0.1 mol per liter of heptane and 20 ml of heptane in a nitrogen atmosphere and the temperature was raised to 70° C. Then 2.33 ml of the hydrocarbon-soluble organomagnesium component (i) and 20 ml of heptane were accurately measured, charged in the dropping funnel and added drop-wise to the flask at 70° C. with stirring over one hour, and further the reaction was continued for one hour at 70° C., resulting in a white suspension reaction solution. To the obtained suspension reaction solution were added 27.7 ml of a heptane solution containing 34 mg of titanium tetrachloride and 31 mg of vanadyl trichloride and the reaction was continued at 70° C. for one hour.

(III) Polymerization of Ethylene

In a 1 l autoclave evacuated were charged 0.5 ml of the component (A) as obtained above and 0.125 mmol of trioctyl aluminum with 0.6 l of dehydrated and deaerated n-heptane, and then 10 mmols of hydrogen were introduced into the autoclave. While keeping the temperature of the autoclave at 180° C., ethylene was introduced into the autoclave at a pressure of 2.0 MPa and the polymerization was carried out for 30 minutes while maintaining the total pressure constant by supplying additional ethylene, resulting in 75 g of a polymer. The catalyst efficiency was 850 Kg/g (Ti+V), MI was 7.2, FR was 32, the density was 0.970 g/cc, and the number of vinyl group was 0.23 per 1000 carbon atoms.

EXAMPLES 2 to 11

Components (A) were prepared by using the organomagnesium component (i), the halide (ii) and the compound (iii) as set forth in Table 1 under the reaction conditions as set forth in Table 1 in the same manner as described in Example 1. Using these components (A) and organoaluminum components (B) as set forth in Table 2 under the reaction conditions as set forth in Table 2, polymerization of ethylene was carried out under the polymerization conditions as set forth in Table 2 in the same manner as in Example 1. The results are shown in Table 2.

AlMg$_6$(n-C$_4$H$_9$)$_{12}$(On-C$_6$H$_{13}$)$_3$, 2.0 mmols of SiHCl$_3$, 0.03 mmols of TiCl$_4$ and 0.03 mmols of VOCl$_3$. Using 1 ml of this suspension and Al(C$_2$H$_5$)$_3$ under the polymerization conditions as set forth in Table 3, polymerization of ethylene was carried out in the same manner as in Example 1. The results are shown in Table 3.

TABLE 3

| Example No. | Al(C$_2$H$_5$)$_3$ (mmol) | Polymerization Conditions | | | Results of Polymerization | | |
|---|---|---|---|---|---|---|---|
| | | Polymerization Temperature (°C.) | Ethylene Pressure (MPa) | H$_2$ (mmol) | Catalyst Efficiency Kg/g (Ti + V) | Polyethylene MI | FR |
| 12 | 0.55 | 140 | 3.0 | 50 | 615 | 50.7 | 27 |
| 13 | 0.06 | 170 | 1.5 | 15 | 620 | 2.8 | 26 |
| 14 | 0.03 | 200 | 3.0 | 10 | 740 | 6.3 | 23 |
| 15 | 0.18 | 250 | 3.0 | 10 | 610 | 11.2 | 25 |

TABLE 1

| Example No. | Organomagnesium Component (i) (mmol) | Halide (ii) (mmol) | (i) + (ii) Reaction Conditions | | Compound (iii) (mmol) | Concentration Titanium plus Vanadium (mmol per liter of solvent) | [(i) + (ii)] + (iii) Reaction Conditions | |
|---|---|---|---|---|---|---|---|---|
| | | | Temperature (°C.) | Time (hour) | | | Temperature (°C.) | Time (hour) |
| 2 | ZnMg$_2$(C$_2$H$_5$)$_2$(n-C$_6$H$_{15}$)$_4$ 2.0 | SiHCl$_3$ 4.0 | 100 | 0.5 | TiCl$_4$ + VOCl$_3$ 0.04   0.02 | 0.6 | 20 | 0.5 |
| 3 | BMg$_3$(C$_2$H$_5$)$_3$(n-C$_{10}$H$_{21}$)$_6$ 2.0 | C$_2$H$_5$BCl$_2$ 15.0 | 60 | 3 | TiCl$_4$ + VOCl$_4$ 0.02   0.18 | 2.0 | 60 | 3 |
| 4 | BeMg(C$_2$H$_5$)$_2$(n-C$_{12}$H$_{23}$)$_2$ 2.0 | SbCl$_3$ 25.0 in benzene | 10 | 15 | TiCl$_3$(Oi-C$_3$H$_7$) + VCl$_4$ 0.1   0.4 | 5.0 | −10 | 20 |
| 5 | LiMg(sec-C$_4$H$_9$)$_9$(n-C$_4$H$_9$)$_{10}$ 2.0 | GeCl$_4$ 36.0 | 50 | 2 | TiCl(On-C$_4$H$_9$) + VOCl$_3$ 6.0   0.3 | 63.0 | 60 | 1 |
| 6 | (C$_2$H$_5$)Mg(n-C$_4$H$_9$) 2.0 | SiHCl$_3$ 2.0 + (C$_2$H$_5$)BCl$_2$ 2.0 | 30 | 8 | TiCl$_4$ + VO(On-C$_4$H$_9$)$_3$ 0.04   0.01 | 0.5 | 120 | 1 |
| 7 | (i-C$_3$H$_7$)Mg(n-C$_4$H$_9$) 2.0 | (CH$_3$)$_2$SiHCl 100 | 60 | 1 | TiCl$_2$(Oi-C$_3$H$_7$)$_2$ 1.87 + VOCl$_2$(On-C$_4$H$_9$) 0.13 | 20.0 | 70 | 4 |
| 8 | Al$_8$Mg(n-C$_8$H$_{17}$)$_{26}$ 2.0 | PCl$_3$ 4.0 | 70 | 1 | TiCl$_4$ + VOCl$_3$ 0.6   0.06 | 6.6 | 80 | 5 |
| 9 | AlMg$_4$(N-C$_4$H$_9$)$_8$(OC$_6$H$_{13}$)$_3$ 2.0 | SiHCl$_3$ 8.0 | 70 | 2 | Ti(On-C$_4$H$_9$)$_4$ + VOCl$_3$ 0.2   0.2 | 4.0 | 80 | 5 |
| 10 | (sec-C$_6$H$_{13}$)$_{1.5}$Mg[OSiH(CH$_3$)$_2$]$_{0.5}$ 2.0 | SiHCl$_2$(CH$_3$) 2.5 | 40 | 2 | TiCl$_4$ + VOCl$_3$ 0.05   1.0 | 10.5 | 40 | 5 |
| 11 | AlMg(n-C$_5$H$_{11}$)$_{14.8}$[N(C$_2$H$_5$)$_2$]$_{0.2}$ | SnCl$_4$ 4.0 | 50 | 2 | TiCl$_4$ + VOCl$_3$ 0.12   0.36 | 4.8 | 10 | 2 |

TABLE 2

| Example No. | Component(A) (ml) | Organoaluminum Compound(B) (mmol) | | Polymerization Conditions | | | Result of Polymerization | | |
|---|---|---|---|---|---|---|---|---|---|
| | | | | Polymerization Temperature (°C.) | Ethylene Pressure (MPa) | H$_2$ (mmol) | Catalyst Efficiency Kg/g(Ti + V) | MI | FR |
| 2 | 2.0 | Al(n-C$_8$H$_{17}$)$_3$ | 0.06 | 180 | 2.0 | 10 | 965 | 15.9 | 23 |
| 3 | 1.0 | Al(n-C$_8$H$_{17}$)$_3$ | 0.03 | 180 | 2.0 | 10 | 776 | 4.8 | 28 |
| 4 | 0.5 | Al(i-C$_4$H$_9$)$_3$ | 0.375 | 180 | 4.0 | 10 | 489 | 2.6 | 36 |
| 5 | 0.5 | Al(i-C$_4$H$_9$)$_3$ | 0.6 | 180 | 4.0 | 10 | 806 | 1.5 | 35 |
| 6 | 2.0 | Al(C$_2$H$_5$)$_2$Cl | 0.5 | 180 | 2.0 | 10 | 930 | 0.4 | 33 |
| 7 | 0.5 | Al(i-C$_4$H$_9$)$_2$Cl | 0.04 | 180 | 2.0 | 5 | 729 | 0.7 | 32 |
| 8 | 0.5 | Al(C$_2$H$_5$)$_{2.5}$(On-C$_4$H$_9$)$_{0.5}$ | 0.9 | 180 | 3.0 | 20 | 592 | 37.3 | 33 |
| 9 | 1.0 | Al(C$_6$H$_{13}$)$_{2.3}$[OSiH(CH$_3$)]$_{0.7}$ | 0.1 | 180 | 3.0 | 20 | 983 | 24.1 | 26 |
| 10 | 0.5 | Aluminum isoprenyl | 0.85 | 180 | 2.0 | 15 | 1024 | 12.5 | 22 |
| 11 | 0.5 | Al(C$_2$H$_5$)$_3$ | 0.74 | 180 | 2.0 | 15 | 476 | 2.6 | 39 |

EXAMPLES 12 to 15

Under the same reactions as in Example 1 was prepared a hydrocarbon-soluble organomagnesium component (i) as a suspension by reacting 2.0 mmols of

EXAMPLE 16

The same hydrocarbon-soluble organomagnesium component (i) as obtained in Example 12 was left to stand in a nitrogen atmosphere at 20° C. for one month.

Then polymerization of ethylene was conducted under the same polymerization conditions as in Example 14, resulting in a polymer having a MI of 3.5 and a FR of 27. The catalyst efficiency was 580 Kg/g (Ti+V).

COMPARATIVE EXAMPLE 1

In a 200 ml flask purged with nitrogen were charged 80 ml of a heptane solution containing 2 mmols of $AlMg(C_2H_5)_3(n-C_4H_9)_2$ and then 20 ml of a heptane solution containing 0.6 mmol of $TiCl_4$ and 0.6 mmol of $VOCl_3$. Using 1 ml of the obtained solution, polymerization of ethylene was carried out under the same polymerization conditions as in Example 1. The obtained polymer had a MI of 3.6 and a FR of 38. The catalyst efficiency was 34 Kg/g (Ti+V).

COMPARATIVE EXAMPLE 2

The same catalyst component (i) as obtained in Comparative Example 1 was left to stand in a nitrogen atmosphere for one day. Then polymerization of ethylene was carried out in the same manner under the same polymerization conditions as in Comparative Example 1. As a result, the catalyst efficiency was 0.3 Kg/g (Ti+V).

EXAMPLE 17

(I) Synthesis of Component (A)

The oxygen and moisture present inside a 250 ml flask equipped with a dropping funnel and a water-cooled reflux condenser were purged with nitrogen, and to the flask were charged 20 ml of a n-octane solution containing trichlorosilane in an amount of 0.1 ml per liter of n-octane and 30 ml of n-octane in a nitrogen atmosphere and the temperature was raised to 70° C. Then 20 ml of a n-octane solution containing 2 mmols $AlMg_3(n-C_4H_9)_{8.1}(On-C_3H_7)_{0.95}$ were accurately measured, charged in the dropping funnel and added dropwise to the flask at 70° C. with stirring over one hour, and further the reaction was continued for one hour at 70° C., resulting in a white suspension reaction solution. To this suspension reaction solution were added 30 ml of a n-octane solution containing 0.085 mmol of titanium tetrachloride at a concentration of titanium of 0.85 mmols per liter of n-octane and the reaction was continued at 70° C. for one hour.

(II) Polymerization of Ethylene

In a 1 l autoclave evacuated were charged 2.0 ml of the component (A) as obtained above and 0.043 mmol of trioctyl aluminum with 0.6 l of dehydrated and deaerated n-octane, and then 15 mmols of hydrogen were introduced into the autoclave. While keeping the temperature of the autoclave at 210° C., ethylene was introduced into the autoclave at a pressure of 4.0 MPa and the polymerization was carried out for 30 minutes while maintaining the total pressure constant by supplying additional ethylene, resulting in 80 g of a polymer. The catalyst efficiency was 980 Kg/g Ti, MI was 4.3, FR was 23, the density was 0.971 g/cc, and the number of vinyl group was 0.40 per 1000 carbon atoms.

EXAMPLES 18 to 31

The procedures of Example 17 were repeated to prepare components (A) except that the organomagnesium components (i) and the halides (ii) were used. Then polymerization of ethylene was carried out under same polymerization conditions as in Example 17. The results are shown in Table 4.

TABLE 4

| Example No. | Organomagnesium Component (i) (mmol) | Halide (ii) (mmol) | Reaction Conditions Temperature (°C.) | Reaction Conditions Time (hour) | Result of Polymerization Catalyst Efficiency Kg/g(Ti + V) | MI | FR |
|---|---|---|---|---|---|---|---|
| 18 | $AlMg_6(n-C_6H_{13})_8(On-C_4H_9)_7$ 2.0 | $SiHCl_2(CH_3)$ 1.0 | 80 | 2 | 1340 | 7.1 | 26 |
| 19 | $AlMg_4(n-C_8H_{17})_8(On-C_6H_{13})_3$ 2.0 | $SiHCl_2(C_2H_5)$ 3.0 | 30 | 5 | 1050 | 3.6 | 29 |
| 20 | $AlMg_7(C_2H_5)_2(n-C_4H_9)_8[OSiH(CH_3)_2]_7$ 2.0 | $SiHCl(CH_3)_2$ 10.0 | 50 | 1.5 | 991 | 0.4 | 32 |
| 21 | $Mg(C_2H_5)_{0.7}(n-C_4H_9)_{0.7}[OSiH(CH_3)(C_2H_5)]_{0.6}$ 2.0 | $SiHCl_2(CHCH_2)$ 20.0 | 70 | 2 | 1035 | 12.5 | 21 |
| 22 | $Mg(sec-C_4H_9)_{0.9}(n-C_4H_9)_{0.9}(On-C_{12}H_{25})_{0.2}$ 2.0 | $SiHCl_3$ 1.8 | 70 | 6 | 1240 | 1.4 | 26 |
| 23 | $LiMg(sec-C_4H_9)_9(n-C_4H_9)_{10}$ 2.0 | $SnCl_3(OC_2H_5)$ 0.2 | 20 | 25 | 465 | 0.8 | 33 |
| 24 | $BMg(C_2H_5)_{2.7}(n-C_7H_{15})_{1.7}(OC_2H_5)_{0.1}$ 2.0 | $GeCl_4$ 4.0 | 100 | 0.5 | 798 | 3.7 | 22 |
| 25 | $BeMg(C_2H_5)_{5.9}[N(C_2H_5)_2]_{0.6}$ 10.0 | $Sb(C_2H_5)_3Cl_2$ 5.0 | 130 | 0.5 | 475 | 32.5 | 37 |
| 26 | $ZnMg_2(C_2H_5)_2(n-C_9H_{19})_4$ 3.0 | $SnCl_4$ 40.0 | 0 | 10 | 403 | 0.3 | 39 |
| 27 | $Al_3Mg(n-C_4H_9)_{16.5}[S(C_2H_5)]_{9.5}$ 2.0 | $(C_2H_5)BCl_2$ 6.0 | 10 | 1 | 613 | 3.6 | 29 |
| 28 | $Mg(i-C_3H_7)_{0.8}(n-C_4H_9)_{0.8}(On-C_5H_{11})_{0.4}$ 2.0 | $SiCl_3(C_6H_5)$ 10.0 | 100 | 2 | 828 | 2.1 | 32 |
| 29 | $BMg(C_2H_5)_4[S(C_8H_{17})]$ 2.0 | $PCl_3$ in ether 6.0 | 50 | 10 | 472 | 9.8 | 35 |
| 30 | $AlMg_5(n-C_6H_{11})_{2.7}(C_6H_5)_{11.5}(OC_{12}H_{23})_{0.8}$ 2.0 | $SiCl_4$ 7.0 | 80 | 2 | 961 | 1.3 | 29 |
| 31 | $AlMg(n-C_4H_9)_2(On-C_8H_{17})_3$ 2.0 | $SiCl_3(OC_2H_5)$ 20.0 | 100 | 1 | 465 | 5.4 | 36 |

EXAMPLES 32 to 40

The oxygen and moisture present inside a 250 ml flask equipped with a dropping funnel and a water-cooled reflux condenser were purged with nitrogen, and to the flask were charged 50 ml of a hexane solution containing 1.9 mmols of trichlorosilane in a nitrogen atmosphere and the temperature was raised to 60° C. Then 20 ml of a hexane solution containing 2.0 mmols of AlMg$_6$(n-C$_6$H$_{13}$)$_8$(On-C$_4$H$_9$)$_7$ was accurately measured, charged in the dropping funnel and added dropwise to the flask at 60° C. with stirring over 1.5 hours. To this reaction solution were added 30 ml of a hexane solution containing the compound (iii) as set forth in Table 5 and the reaction was conducted under the reaction conditions as set forth in Table 5. Using the obtained component (A) and the organoaluminum compound (B), polymerization of ethylene was conducted under the same polymerization conditions as in Example 17 in the same manner as in Example 17. The results are shown in Table 5.

TABLE 5

| Example No. | Compound (iii) (mmol/l*) | | Reaction Conditions | | Organoaluminum Compound (B) (mmol) | |
|---|---|---|---|---|---|---|
| | | | Temperature (°C.) | Time (hour) | | |
| 32 | TiCl$_3$(Oi-C$_3$H$_7$) | 0.2 | 70 | 1 | Al(i-C$_4$H$_9$)$_3$ | 0.04 |
| 33 | TiCl$_{3.5}$(On-C$_4$H$_9$)$_{0.5}$ | 1.12 | 80 | 2 | Al(n-C$_6$H$_{13}$)$_3$ | 0.03 |
| 34 | TiCl$_3$(OC$_2$H$_5$) | 2.36 | 100 | 0.5 | Al(C$_2$H$_5$)$_3$ | 0.41 |
| 35 | TiCl$_3$(On-C$_8$H$_{17}$) | 0.43 | 90 | 1.5 | Al(C$_2$H$_5$)$_3$ | 0.08 |
| 36 | TiCl$_{3.5}$(On-C$_{18}$H$_{37}$)$_{0.5}$ | 0.85 | 20 | 10 | Al(i-C$_4$H$_9$)$_{2.5}$Cl$_{0.5}$ | 0.07 |
| 37 | TiCl(OC$_6$H$_4$CH$_3$)$_3$ | 4.87 | 20 | 3 | Al(C$_2$H$_5$)$_{2.5}$(OSiH . CH$_3$ . C$_2$H$_5$)$_{0.5}$ | 7.79 |
| 38 | TiBr$_4$ | 0.08 | 130 | 8 | Al(C$_2$H$_5$)$_2$(OC$_2$H$_5$) | 0.10 |
| 39 | TiCl$_4$ | 0.78 | 60 | 4 | Al(n-C$_{10}$H$_{21}$)$_3$ | 0.31 |
| 40 | Ti(Oi-C$_3$H$_7$)$_4$ | 0.65 | 70 | 1 | Al(n-C$_8$H$_{17}$)$_3$ | 0.02 |

| Example No. | Polymerization Conditions | | | Results of Polymerization | | |
|---|---|---|---|---|---|---|
| | Temperature (°C.) | Ethylene Pressure (MPa) | H$_2$ (mmol) | Catalyst Efficiency Kg/g(Ti + V) | MI | FR |
| 32 | 200 | 5.0 | 10 | 986 | 22.5 | 27 |
| 33 | 180 | 4.0 | 15 | 908 | 0.9 | 25 |
| 34 | 160 | 2.0 | 30 | 879 | 1.2 | 28 |
| 35 | 180 | 6.0 | 10 | 1305 | 7.6 | 28 |
| 36 | 190 | 4.0 | 15 | 922 | 3.6 | 33 |
| 37 | 160 | 3.0 | 15 | 611 | 4.2 | 36 |
| 38 | 180 | 3.0 | 20 | 391 | 8.3 | 41 |
| 39 | 260 | 10.0 | 5 | 833 | 12.5 | 26 |
| 40 | 180 | 3.0 | 10 | 416 | 7.2 | 32 |

Note:
*1 l of the inert reaction solvent

EXAMPLE 41

Under the same reaction conditions as in Example 1, 2.0 mmols of AlMg(N-C$_4$H$_9$)$_{5.5}$[OSiH(CH$_3$)$_2$]$_{0.5}$, 3 mmols of HSi.CH$_3$.Cl$_2$, 0.04 mmol of TiCl$_4$ and 0.02 mmol of VOCl$_3$ at a concentration of titanium and vanadium of 0.6 mmol per liter of the reaction solvent were reacted to form a component (A). Using 1 ml of the obtained suspension reaction solution, polymerization of ethylene was conducted under the same polymerization conditions as in Example 1 to give a polymer having a MI of 3.6 and a FR of 34. The catalyst efficiency was 520 Kg/g (Ti+V).

EXAMPLE 42

Using 0.5 ml of the same component (A) as in Example 1 and 0.125 mmol of trioctyl aluminum, 1.5 mols of ethylene were polymerized at 150° C. at a pressure of ethylene of 2.0 MPa in the presence of 2 mmols of hydrogen. After the temperature was raised to 200° C. and 50 mmols of hydrogen were introduced into the autoclave, 1.5 mols of ethylene were further polymerized at a pressure of ethylene of 2.0 MPa, resulting in a polymer having a MI of 0.6 and a FR of 95.

EXAMPLE 43

In the same manner as in Example 17, 1.2 mols of ethylene were polymerized at 140° C. at a pressure of ethylene of 2.0 MPa in the presence of 2 mmols of hydrogen by using 2.0 ml of the same component (A) as in Example 17 and 0.04 mmol of triethyl aluminum. After 90 mmols of hydrogen were introduced into the autoclave and the temperature was raised to 220° C., 1.5 mols of ethylene were further polymerized at a pressure of ethylene of 2.0 MPa, resulting in a polymer having a MI of 0.9 and a FR of 97.

EXAMPLE 44

In a 1 l autoclave evacuated were charged 2.0 ml of the same component (A) as in Example 18 and 0.03 mmol of tridecyl aluminum with 0.2 l of dehydrated and deaerated hexane. After 5 mmols of hydrogen were introduced into the autoclave, ethylene was added up to a pressure of 6.0 MPa and the temperature was raised to 270° C., and polymerization of ethylene was conducted for 10 minutes, resulting in 35 g of a polymer having a MI of 6.5 and a FR of 24.

EXAMPLE 45

A component (A) was prepared in the same manner as in Example 17 except that 2 mmols of AlMg$_7$(C$_2$H$_5$)$_{10}$(n-C$_4$H$_9$)$_7$, 3.5 mmols of SiHCl$_3$, 0.04 mmol of TiCl$_2$(On-C$_4$H$_9$)$_2$ and 0.04 mmol of VOCl$_3$ at a concentration of titanium and vanadium of 0.8 mmol per liter of the reaction solvent were employed.

In a 1 l autoclave evacuated were charged 3 ml of the obtained component (A) and 0.05 mmol of Al(i-C$_4$H$_9$)$_3$ with 0.6 l of dehydrated and deaerated cyclohexane. After 10 mmols of hydrogen and 40 mmols of butene-1 were added into the autoclave, the temperature was raised 170° C. and ethylene was added up to a pressure of 2.0 MPa. Copolymerization of ethylene with butene-1 was conducted for 30 minutes while maintaining the total pressure constant by supplying additional ethylene. As a result, the catalyst efficiency was 894 Kg/g (Ti+V), MI was 7.6, FR was 28, the density was 0.951 g/cc.

EXAMPLES 46 TO 51

A component (A) was prepared in the same manner as in Example 17 except that 2 mmols of $AlMg_3(n-C_4H_9)_6(On-C_6H_{13})_3$, 1.5 mmols of $SiHCl_3$ and 0.10 mmol of $TiCl_4$ at a concentration of titanium of 1.0 mmol per liter of the reaction solvent were used. In a 1 l autoclave evacuated were charged 2.0 ml of the obtained component (A) and 0.08 mmol of $Al(C_2H_5)_3$ with 0.6 l of dehydrated and deaerated kerosene. After 6 mmols of hydrogen and an olefin or a polyene as set forth in Table 6 were introduced into the autoclave, the temperature was raised to 200° C. and ethylene was added up to a pressure of 3.0 MPa. Copolymerization of ethylene with the olefin was conducted for 30 minutes while maintaining the total pressure constant by supplying additional ethylene. The results are shown in Table 6.

TABLE 6

| Example No. | α-Olefin or Polyene (mmol) | | Catalyst Efficiency [Kg/g (Ti + V)] | Products | | |
|---|---|---|---|---|---|---|
| | | | | MI | FR | Density (g/cc) |
| 46 | Propylene | 100 | 895 | 2.5 | 27 | 0.942 |
| 47 | Hexene-1 | 50 | 952 | 9.6 | 29 | 0.951 |
| 48 | 4-Methylpentene-1 | 200 | 1019 | 8.3 | 21 | 0.928 |
| 49 | Octene-1 | 400 | 746 | 15.2 | 22 | 0.920 |
| 50 | Isobutene | 100 | 931 | 7.1 | 26 | 0.938 |
| 51 | Isoprene | 50 | 712 | 0.9 | 28 | 0.949 |

EXAMPLES 52 TO 56

A component (A) was prepared in the same manner as in Example 1 using 2.0 mmols of $AlMg_4(n-C_6H_{13})_7(On-C_4H_9)_4$, 10 mmols of $SiHCl_3$, 0.05 mmol of $TiCl_4$ and 0.15 mmol of $VOCl_3$. In a 1 l autoclave evacuated were charged 1 ml of the obtained component (A) and 0.1 mmol of $Al(n-C_{10}H_{21})_3$ with 0.6 l of dehydrated and deaerated heptane. After 5 mmols of hydrogen and an α-olefin as set forth in Table 7 were introduced into the autoclave, the temperature was raised to 160° C. and ethylene was added up to a pressure of 3.0 MPa. Copolymerization of ethylene with the α-olefin was conducted for 30 minutes while maintaining the total pressure constant by supplying additional ethylene. The results are shown in Table 2.

TABLE 7

| No. | α-Olefin (mmol) | Catalyst Efficiency [Kg/g(Ti + V)] | Results of Polymerization | | |
|---|---|---|---|---|---|
| | | | Products | | |
| | | | MI | FR | Density (g/cc) |
| 52 | Butene-1 100 | 860 | 2.5 | 22 | 0.941 |
| 53 | Butene-1 300 | 920 | 13.3 | 21 | 0.918 |
| 54 | Propylene 50 | 770 | 2.5 | 24 | 0.952 |
| 55 | 4-Methylpentene-1 150 | 810 | 8.6 | 20 | 0.938 |
| 56 | Octene-1 200 | 970 | 7.4 | 29 | 0.926 |

COMPARATIVE EXAMPLE 3

(I) Synthesis of Component (A)

The oxygen and moisture present inside a 250 ml flask equipped with a dropping funnel and a water-cooled reflux condenser were purged with nitrogen, and to the flask were charged 50 ml of a heptane solution containing trichlorosilane in a nitrogen atmosphere and the temperature was raised at 50° C. Then 50 ml of a heptane solution containing 50 mmols of $AlMg_4(n-C_4H_9O)_8(On-C_3H_7)_3$ were accurately measured, charged in the dropping funnel and added dropwise to the flask at 90° C. over one hour with stirring, resulting in a white suspension reaction solution. Then the white solid was separated by filtration, washed and dried. In a pressure-resistant ampoule purged with nitrogen were charged 2 g of the obtained while solid and 40 ml of titanium tetrachloride and these substances were contacted at 130° C. for 2 hours with stirring. Then the obtained solid component was separated. As the result of analysis, the solid component contained 2.9% by weight of titanium.

(II) Polymerization of Ethylene

Polymerization of ethylene was carried out under the same polymerization conditions as in Example 1 except that 20 mg of the obtained solid component and 0.4 mmol of triisobutyl aluminum were used and that the polymerization temperature of 160° C. was employed. As a result, 66 g of polyethylene were obtained. The catalyst efficiency was 114 Kg/g Ti, MI was 4.2, FR was 30, and the number of vinyl group was 0.75 per 1000 carbon atoms.

COMPARATIVE EXAMPLE 4

Polymerization of ethylene was carried out under the same polymerization conditions as in Comparative Example 3 except that the polymerization temperature of 190° C. was used. As a result, 0.7 g of polyethylene was obtained and the catalyst efficiency was 1.3 Kg/g Ti.

COMPARATIVE EXAMPLE 5

(I) Synthesis of Component (A)

The procedure of Example 1 for preparing the component (A) was repeated except that the 34 mg of titanium tetrachloride and 31 mg of vanadyl trichloride were replaced by 200 mg of titanium tetrachloride and 200 mg of vanadyl trichloride, respectively.

(II) Polymerization of Ethylene

Polymerization of ethylene was conducted in the same manner as in Example 1 except that 5.0 ml of the obtained component (A) and 0.4 mmol of $Al(C_2H_5)_3$ were used. As a result, a very small amount of polyethylene was formed.

EXAMPLES 57 TO 59 AND COMPARATIVE EXAMPLE 6

(I) Synthesis of Component (A)

A component (A) was prepared in the same manner as in Example 1 except that 3 mmols of $AlMg_9(C_2H_5)_9(n-C_4H_9)_7[OSiH(CH_3)_2]_5$, 5 mmols of $CH_3SiHCl_2$, 0.09 mmol of $TiCl_4$ and 0.11 mmol of $VOCl_2(On-C_4H_9)$ at a concentration of titanium and vanadium of 2 mmols per liter of the reaction solvent were employed.

(III) Polymerization of ethylene

Polymerization of ethylene was conducted in the same manner as in Example 1 by using 2.0 ml of the above component (A) and Al(n-C$_8$H$_{17}$)$_3$ in an amount as set forth in Table 8. The results are shown in Table 8.

TABLE 8

| Example No. | Al(n-C$_8$H$_{17}$)$_3$ (mmol) | Catalyst Efficiency [Kg/g(Ti + V)] | MI | FR |
|---|---|---|---|---|
| 57 | 2.81 | 498 | 12.5 | 29 |
| 58 | 0.08 | 753 | 6.2 | 22 |
| 59 | 0.01 | 183 | 4.1 | 24 |
| Comparative Example No. 6 | 0 | 6 | — | — |

EXAMPLES 60 TO 63

Polymerization of ethylene was conducted in the same manner as in Example 1 by using 2.0 ml of the same component (A) as obtained in Example 1 and an organometal component (B) as set forth in Table 9. The results are shown in Table 9.

TABLE 9

| Example No. | Organometal Component (B) (mmol) | Catalyst Efficiency [Kg/g(Ti + V)] | Polyethylene MI | FR |
|---|---|---|---|---|
| 60 | Zn(C$_2$H$_5$)$_2$  1.51 | 365 | 1.6 | 32 |
| 61 | AlMg$_2$(n-C$_4$H$_9$)$_5$(sec-C$_4$H$_9$)$_2$  0.86 | 486 | 8.3 | 27 |
| 62 | B(n-C$_4$H$_9$)$_3$  0.52 | 286 | 16.2 | 24 |
| 63 | Mg(C$_2$H$_5$)$_{0.8}$(n-C$_4$H$_9$)$_{0.8}$(On-C$_4$H$_9$)$_{0.4}$  2.0 | 407 | 5.6 | 26 |

It will be appreciated that the instant specification and examples are set forth by way of illustration and not limitation, and that various modifications and changes may be made without departing from the spirit and scope of the present invention.

What is claimed is:

1. A process for polymerizing an α-olefin comprising contacting the olefin in liquid phase at a temperature of about 120° to about 320° C. with a catalyst comprising a component (A) and an organometal component (B), the component (A) being produced by reacting a hydrocarbon-soluble organomagnesium component (i) of the formula

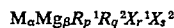

$$M_\alpha Mg_\beta R_p^1 R_q^2 X_r^1 X_s^2$$

wherein

α, p, q, r and s each independently is 0 or a number greater than 0,
β is 1 or a number greater than 1,
p+q+r+s=mα+2β
0≦(r+s)/(α+β)<2,
m is the valence of M,
M is a metal of the 1st to 3rd groups of the Periodic Table,
R$^1$ and R$^2$ each independently is a hydrocarbon group having 1 to 20 carbon atoms,
X$^1$ and X$^2$ each independently is hydrogen or an organic electronegative group containing O, N or S, with (ii) a halide of boron, silicon, germanium, tin, phosphorus, antimony, bismuth or zinc, and contacting the product of (i)+(ii) in an inert reaction medium with (iii) a compound of tetravalent titanium or (iii) a compound of tetravalent titanium plus a compound of pentavalent or tetravalent vanadium at a concentration of titanium plus vanadium of at most about 2 mols per liter of the inert reaction solvent, the atomic ratio of Mg/Ti or (Ti+V) in (A) being about 3 to about 500.

2. A process of claim 1, wherein M in the organomagnesium component (i) of the component (A) is lithium, berylium, boron, aluminum or zinc metal.

3. A process of claim 2, wherein M in the organomagnesium component (i) of the component (A) is aluminium metal.

4. A process of claim 1, wherein α in the organomagnesium component (i) is 0 to 1.5.

5. A process of claim 4, wherein α in the organomagnesium component (i) is 0 to 1.

6. A process of claim 1, wherein X$^1$ and X$^2$ in the organomagnesium compound (i) each independently is OR$^3$, OSiR$^4$R$^5$R$^6$, NR$^7$R$^8$ or SR$^9$ wherein R$^3$, R$^7$, R$^8$ and R$^9$ each independently is a hydrocarbon group having 1 to 15 carbon atoms and R$^4$, R$^5$ and R$^6$ each independently is a hydrogen atom or a hydrocarbon group having 1 to 15 carbon atoms.

7. A process of claim 6, wherein X$^1$ and X$^2$ in the organomagnesium compound (i) each independently is OR$^3$.

8. A process of claim 6, wherein X$^1$ and X$^2$ in the organomagnesium compound (i) each independently is OSiR$^4$R$^5$R$^6$.

9. A process of claim 1, wherein the amount of X$^1$ and X$^2$ in the organomagnesium compound is 0<(r+s)/)α+β)≦1.

10. A process of claim 1, wherein the halide (ii) is a chloride of boron, slicon or germanium.

11. A process of claim 10, wherein the halide (ii) is a chlorosilane.

12. A process of claim 1, wherein, as the compound (iii), a compound of titanium and a compound of vanadium are employed.

13. A process of claim 12, wherein the mol ratio of the titanium compound to the vanadium compound is 0.1 to 10.

14. A process of claim 1, wherein the reaction between the component (i) and the halide (ii) is conducted at a temperature of from about −50° to about 150° C.

15. A process of claim 1, wherein the mol ratio of the halide (ii) to the compound (i) is 0.01 to 100.

16. A process of claim 1, wherein the contact of the reaction product of (i)+(ii) with (iii) the compound of titanium or (iii) the compound of titanium plus the compound of vanadium is conducted at a temperature of from about −50° to 150° C.

17. A process of claim 16, wherein the contact of the reaction product of (i)+(ii) with (iii) the compound of titanium or (iii) the compound of titanium plus the compound of vanadium is conducted at a temperature of from about 0° to about 95° C.

18. A process of claim 1, wherein the atomic ratio of Mg/Ti or (Ti+V) in the component (A) is from about 5 to about 200.

19. A process of claim 18, wherein the atomic ratio of Mg/Ti or (Ti+V) in the component (A) is from about 10 to about 100.

20. A process of claim 1, wherein the mol ratio of the organometal compound (B) to Ti or (Ti+V) in the component (A) is about 3 to about 1000.

21. A process of claim 1, wherein the organometal component (B) is an organoaluminum compound, an organoboron compound or an organozinc compound.

22. A process of claim 21, wherein the organometal component (B) is an organoaluminum compound.

23. A process of claim 22, wherein the organoaluminum compound is a trialkylaluminum, an alkylaluminum halide, an alkylaluminum alkoxide, an alkylaluminum siloxide and a reaction product of a trialkylaluminum and a conjugated diene.

24. A process of claim 1, wherein the α-olefin is ethylene.

25. A process of claim 24, wherein the polymerization of ethylene is carried out at a partial pressure of ethylene of from about 1 to about 25 MPa and at a polymerization temperature of from about 150° to about 300° C.

26. A process of claim 1, wherein copolymerization of ethylene with an α-olefin other than ethylene or a polyene.

27. A process of claim 26, wherein the α-olefin other than ethylene is a $C_{3-20}$ α-olefin.

28. A process of claim 26, wherein the polyene is butadiene or isoprene.

29. A process of claim 26, wherein the mol ratio of the α-olefin or polyene to ethylene is at most 5.

30. A process of claim 1, wherein the polymerization of an α-olefin is conducted in a plurality of polymerization zones.

31. A process of claim 1, wherein the polymerization temperature is about 200° C.

32. A catalyst useful for polymerizing an α-olefin comprising a component (A) and an organometal component (B), the component (A) being produced by reacting a hydrocarbon-soluble organomagnesium component (i) of the formula

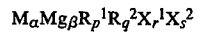

wherein

α, p, q, r and s each independently is 0 or a number greater than 0,

β is 1 or a number greater than 1, $p+q+r+s=m\alpha+2\beta$, $0\leq(r+s)/(\alpha+\beta)<2$, m is the valence of M, M is a metal of the 1st to 3rd groups of the Periodic Table, $R^1$ and $R^2$ each independently is a hydrocarbon group having 1 to 20 carbon atoms, $X^1$ and $X^2$ each independently is hydrogen or an organic electronegative group containing O, N or S, with (ii) a halide of boron, silicon, germanium, tin, phosphorus, antimony, bismuth or zinc, and contacting the product of (i) + (ii) in an inert reaction medium with (iii) a compound of tetravalent titanium or (iii) a compound of tetravalent titanium plus a compound of pentavalent or tetravalent vanadium at a concentration of titanium plus vanadium of at most about 2 mols per liter of the inert reaction solvent, the atomic ratio of Mg/Ti or (Ti+V) in (A) being about 3 to about 500.

* * * * *